(12) United States Patent
Sugiyama et al.

(10) Patent No.: US 6,359,404 B1
(45) Date of Patent: Mar. 19, 2002

(54) CONTROL APPARATUS FOR HYBRID VEHICLE

(75) Inventors: Tetsu Sugiyama; Kiyoshi Asami; Eijiro Shimabukuro, all of Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/655,868

(22) Filed: Sep. 6, 2000

(30) Foreign Application Priority Data

Sep. 7, 1999 (JP) .......................................... 11-253653
Jul. 12, 2000 (JP) ....................................... 2000-211872

(51) Int. Cl.$^7$ ................................................ H02P 7/00
(52) U.S. Cl. ...................... 318/432; 701/22; 180/65.2; 180/65.8
(58) Field of Search ....................... 318/432; 180/65.2, 180/65.8, 65.4; 701/22; 477/46

(56) References Cited

U.S. PATENT DOCUMENTS 6,090,007 A * 7/2000 Nakajima et al. ............. 477/46
6,196,344 B1 * 3/2001 Tamor ........................ 180/65.4
6,233,508 B1 * 5/2001 Deguchi et al. ........... 180/65.2

\* cited by examiner

Primary Examiner—Karen Masih
(74) Attorney, Agent, or Firm—Armstrong, Westerman & Hattori, LLP

(57) ABSTRACT

A control apparatus including a requestedtorque calculating device which calculates a torque requested for driving the hybrid vehicle; and a torque control device which controls a torque generated by an engine and a torque generated by an electric motor of the hybrid vehicle based on the requested torque calculated by the requested torque calculating device. The torque control device controls the electric motor so as to generate a torque obtained by subtracting a torque to be generated by the engine from the requested torque. Acoording to this control apparatus, if the responsiveness in changing the transmission ratio of the transmission is poor and the torque generated by the engine becomes lower than therequested torque, the electric motor is controlled to generate the deficient (supplementary) torque, and smooth acceleration of the vehicle can be performed.

8 Claims, 9 Drawing Sheets

CONTROL APPARATUS FOR HYBRID VEHICLE

BACKGROUND OF THE INVENTION

1. Field of the Invention

The present invention relates to a control apparatus for a parallel hybrid vehicle which uses an engine and a motor for driving the vehicle. In particular, the present invention relates to a control technique for transmitting the output of an engine to driving wheels using a CVT (Continuously Variable Transmission) in a parallel hybrid vehicle.

2. Description of the Related Art

In conventional (non-hybrid) vehicles comprising engines and continuously variable transmissions, by means of detecting the amount of depression of an accelerator pedal using a throttle opening sensor, the driving force required by the drivers of the vehicles is calculated, and based on the calculation results, the engine speed and the transmission ratio are selected to smoothly drive the vehicle.

In comparison with vehicles comprising stage transmissions, because vehicles comprising continuously variable transmissions can select the optimum transmission ratio according to the condition of the vehicle, it is possible to maintain the desirable condition in which the engine can provide a higher energy efficiency. Therefore, vehicles comprising continuously variable transmissions are expected to have better fuel consumption.

However, in vehicles comprising continuously variable transmissions, the responsiveness in changing the transmission ratio is not good, there is the problem that the acceleration response when a kick down is performed is inferior to that of vehicles comprising stage transmissions.

Furthermore, because the acceleration response is not good due to the response delay in changing the transmission ratio, there is a tendency that the driver unduly depresses the accelerator pedal during the delay in the acceleration response, and that the throttle is opened wider than the driver wishes. In such cases, there arise the problems that fuel consumption is increased, exhaust gas is increased, and noise and vibration are increased.

The above problems are common to hybrid vehicles comprising continuously variable transmissions. That is, hybrid vehicles can enter into a running mode in which the vehicle is driven by the engine, and when in such a running mode using the engine, the problems due to the inferior responsiveness in changing the transmission ratio occur, similarly to those of conventional vehicles.

Also, when the running mode of a hybrid vehicle is shifted from a running mode in which the vehicle is driven by an electric motor to a running mode in which the vehicle is driven by an engine, there is the case that the transmission ratio of the transmission connected to the engine is not set to an optimum ratio. In such a case, due to the inferior responsiveness in changing the transmission ratio, the driving force for the vehicle is temporarily and suddenly changed when the running mode is shifted.

SUMMARY OF THE INVENTION

The object of the present invention is to provide a control apparatus and method for a hybrid vehicle by which smooth acceleration of the vehicle is possible without a delay in generating the driving force when requested by the driver.

In order to achieve the above object, the control apparatus according to the present invention comprises a requested torque calculating device which calculates a torque requested for driving the hybrid vehicle; and a torque control device which controls a torque generated by an engine and a torque generated by an electric motor of the hybrid vehicle based on the requested torque calculated by the requested torque calculating device. The torque control device controls the electric motor so as to generate a torque obtained by subtracting a torque to be generated by the engine from the requested torque.

According to this control apparatus, if the responsiveness in changing the transmission ratio of the transmission is poor and the torque generated by the engine becomes lower than the requested torque, the electric motor is controlled to generate the deficient (supplementary) torque, and smooth acceleration of the vehicle can be performed.

Also, even when the running mode of the hybrid vehicle is shifted from a running mode in which the vehicle is driven by an electric motor to a running mode in which the vehicle is driven by an engine, it is possible to avoid the shock due to the torque change and to shift the running mode smoothly.

Furthermore, because the acceleration response can be improved, it is possible to prevent the problem that the driver unduly depresses the accelerator pedal during the delay in the acceleration response, and that the throttle is opened wider than the driver wishes. Therefore, the increases in fuel consumption, exhaust gas, and noise and vibration due to the above problem, can be prevented.

When the requested torque is greater than the maximum torque which the engine can generate, the torque control device may control the engine so as to generate the maximum torque and may control the electric motor so as to generate a torque obtained by subtracting the maximum torque from the requested torque.

In this case, if the responsiveness in changing the transmission ratio of the transmission is poor and the torque generated by the engine becomes lower than the requested torque, the deficient torque can be generated by the electric motor, and smooth acceleration of the vehicle can be performed.

The torque control device may comprise an engine torque restricting device which restricts the torque to be generated by the engine in accordance with a predetermined condition.

In this case, the engine torque restricting device restricts the torque to be generated by the engine in accordance with a predetermined condition, and the deficient torque is generated by the electric motor, and smooth acceleration of the vehicle can be performed.

The engine torque restricting device may restrict the torque to be generated by the engine when the temperature of the catalyst provided in the exhaust system of the engine is higher than a predetermined temperature.

In this case, when the temperature of the catalyst provided in the exhaust system of the engine is higher than the predetermined temperature, the engine torque restricting device restricts the torque to be generated by the engine, and the deficient torque is generated by the electric motor. Therefore, smooth acceleration of the vehicle can be performed.

The engine torque restricting device may restrict the torque to be generated by the engine when a remaining battery charge of a power storage unit is greater than a predetermined battery charge.

In this case, when a remaining battery charge of the power storage unit is greater than the predetermined battery charge, the engine torque restricting device restricts the torque to be generated by the engine, and the deficient torque is generated by the electric motor. Therefore, smooth acceleration of the vehicle can be performed.

The engine torque restricting device may stop restricting the torque to be generated by the engine when the requested torque is greater than a predetermined torque.

In this case, when the requested torque is greater than a predetermined torque, for example, when the accelerator pedal is fully depressed, the engine torque restricting device stops restricting the torque to be generated by the engine. Therefore, even when quick acceleration is requested, acceleration of the vehicle can be performed smoothly and quickly.

The requested torque calculating device may calculate a torque requested for driving the driving wheels of the hybrid vehicle. The torque control device may comprise a conversion device which converts an engine torque to be generated by the engine to a driving wheel torque to be applied to the driving wheels based on at least a transmission ratio in a transmission which transmits the driving force from the engine to the driving wheels. Furthermore, the torque control device may control the electric motor so as to generate a torque obtained by subtracting the driving wheel torque converted by the conversion device from the requested torque.

In this case, the requested torque calculating device calculates a torque requested for driving the driving wheels of the hybrid vehicle, and the conversion device converts an engine torque to be generated by the engine to a driving wheel torque to be applied to the driving wheels based on at least the transmission ratio. Then, the torque control device controls the electric motor so as to generate a torque obtained by subtracting the driving wheel torque converted by the conversion device from the requested torque. Therefore, if the relationship between the engine torque generated by the engine and the driving wheel torque is modified due to the change of the transmission ratio, it is possible for the motor to generate a suitable torque in consideration of the modification of the above relationship. That is, the precision in controlling the motor can be improved.

Another aspect of the present invention is a hybrid vehicle comprising an engine which generates a torque for driving the hybrid vehicle; a transmission which is connected to an output shaft of the engine; driving wheels which are connected to an output shaft of the transmission; an electric motor which is connected to the driving wheels and assists the torque generated by the engine; a requested torque calculating device which calculates a torque requested for driving the hybrid vehicle; and a torque control device which controls a torque generated by an engine and a torque generated by an electric motor of the hybrid vehicle based on the requested torque calculated by the requested torque calculating device. The torque control device controls the electric motor so as to generate a torque obtained by subtracting a torque to be generated by the engine from the requested torque.

According to this hybrid vehicle, if the responsiveness in changing the transmission ratio of the transmission is poor and the torque generated by the engine becomes lower than the requested torque, the electric motor is controlled to generate the deficient torque.

Furthermore, another aspect of the present invention is a control method for a hybrid vehicle, comprising calculating a torque requested for driving the hybrid vehicle; controlling a torque generated by an engine and a torque generated by an electric motor of the hybrid vehicle based on the requested torque calculated by the requested torque calculating device; and controlling the electric motor so as to generate a torque obtained by subtracting a torque to be generated by the engine from the requested torque.

According to this control method, if the responsiveness in changing the transmission ratio of the transmission is poor and the torque generated by the engine becomes lower than the requested torque, the electric motor is controlled to generate the deficient torque, and the vehicle can be driven smoothly.

DETAILED DESCRIPTION OF THE INVENTION

Figure 1:
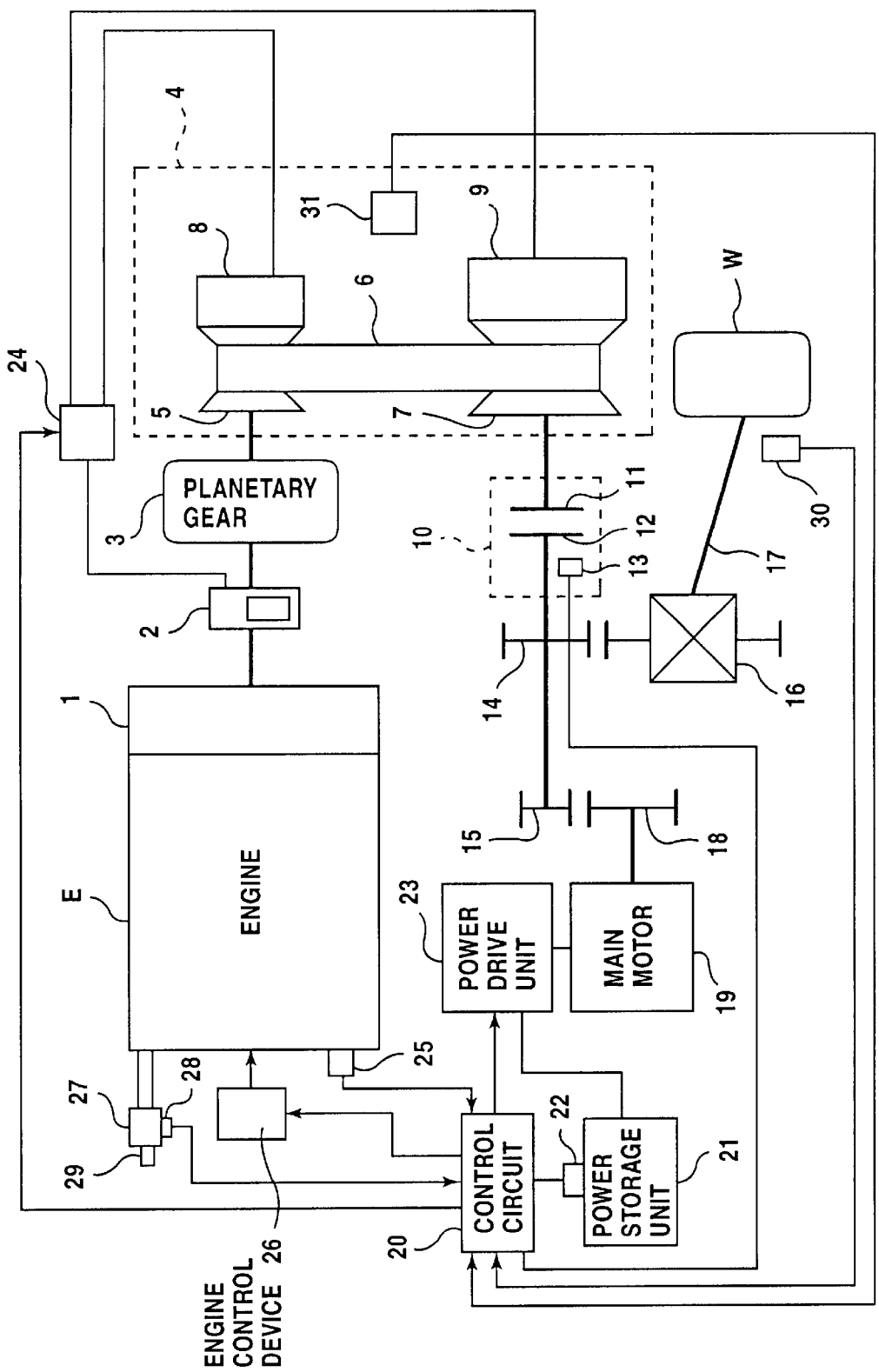
FIG. 1 is a block diagram illustrating the transmission and control systems of a hybrid vehicle to which a first embodiment of the present invention is applied.

Hereinafter, a preferred embodiment of the control apparatus and control method for a hybrid vehicle according to the present invention will be explained referring to the figures. FIG. 1 is a block diagram illustrating the transmission and control system of a hybrid vehicle in which the first embodiment of the present invention is applied.

First, the transmission system will be explained. This vehicle comprises an engine E which is activated by the combustion energy of a fuel, and the output shaft of the engine E is connected to an oil pump 2 via a sub motor 1. The sub motor 1 performs the starting of the engine E and the assistance of the output of the engine E, and so on. The oil pump 2 is rotated by the engine E and supplies oil pressure to an oil pressure controller 24, and the oil pressure controller 24 controls a continuously variable transmission (hereinafter, referred as CVT) 4 so as to change the transmission ratio thereof. The engine E comprises an exhaust system 29, and a catalyst 27 is provided in the exhaust system 29.

The output shaft of the engine E is further connected to a planetary gear 3 which changes the running direction of the vehicle to forwards or reverse. A select lever (not shown) is connected to the planetary gear 3, and the running direction of the vehicle is changed by operating the select lever.

The output shaft of the planetary gear 3 is connected to a driving pulley 5 provided in the CVT 4. The CVT 4 comprises, in addition to the driving pulley 5, a metal belt 6, a driven pulley 7, and a pair of side chambers 8 and 9, and the metal belt 6 is wound between the driving pulley 5 and the driven pulley 7 so as to transmit the driving force between the pulleys 5 and 7.

The side chambers 8 and 9 are respectively provided at the sides of the driving pulley 5 and the driven pulley 7, and they are connected to the oil pressure controller 24 via oil passages. The wrapping diameters of the metal belt 6 around the pulleys 8 and 9 can be independently adjusted by changing the widths of the pulleys 8 and 9 by means of controlling the oil pressures applied into the side chambers 8 and 9 from the oil pump 3 via the oil pressure controller 24.

The driven pulley 7 in the CVT 4 is connected to an engaging element 11 provided in a clutch 10. The clutch 10 comprises, in addition to the engaging element 11, an engaging element 12 facing the engaging element 11, and a clutch control actuator 13 for engaging or disengaging the engaging elements 11 and 12.

The engaging element 12 in the clutch 10 is connected to a final reduction gear 14 and a gear 15. The final reduction gear 14 is engaged with a differential gear 16, and this differential gear 16 is connected to driving wheels W via a driving shaft 17. The gear 15 is engaged with a gear 18 which is connected to a rotational shaft of a main motor 19.

Next, the control system in this vehicle will be explained. The control system includes a control circuit 20, which is electrically connected to a remaining battery charge sensor 22 provided on a power storage unit 21, a power drive unit 23 for controlling the main motor 19, the clutch control actuator 13 in the clutch 10, and the oil pressure controller 24 for controlling the oil pressures applied to the side chambers 8 and 9 in the CVT 4. The power storage unit 21 consists of a battery, etc., and is a driving source of the main motor 19. The power storage unit 21 is connected to the main motor 19 via the power drive unit 23.

The control circuit 20 is also connected to an engine sensor 25 which detects the various conditions of the engine E such as a water temperature TW in the engine E, the engine speed Ne, the intake air temperature TA, the intake air pressure PA, and the amount of depression of the accelerator pedal AP. The control circuit 20 is further connected to an engine control device 26 which is connected to the engine E for controlling the engine E.

The control circuit 20 is further connected to a catalyst temperature sensor 28 for measuring the temperature of the catalyst 27, to a vehicle speed sensor 30 for measuring the vehicle speed VCar, and to a ratio sensor for detecting the transmission ration of the CVT 4.

Next, referring to the block diagram shown in FIG. 2, the control circuit 20 will be explained in detail. The control circuit 20 comprises a requested driving force calculation device 32, a requested engine torque calculation device 33, a transmission efficiency calculation device 34 for calculating the transmission efficiency of the CVT 4 based on the transmission ratio of the CVT 4, a full throttle torque calculation device 35, an engine torque restriction device 36, and a difference calculation device 37.

The requested driving force calculation device 32 receives the amount of depression of the accelerator pedal AP and the vehicle speed VCar from outside of the control circuit 20. The requested driving force calculation device 32 outputs value of the a requested torque, and transmits this requested torque value to the requested engine torque calculation device 33. The requested engine torque calculation device 33 also receives the transmission ratio of the CVT 4 from outside of the control circuit 20. This transmission ratio of the CVT 4 is also input to the transmission efficiency calculation device 34, and the transmission efficiency calculation device 34 outputs a transmission efficiency to the requested engine torque calculation device 33. The requested engine torque calculation device 33 outputs a requested engine torque and transmits it to the engine torque restriction device 36 and the difference calculation device 37.

The full throttle torque calculation device 35 receives the engine speed Ne, the intake air temperature TA, the intake air pressure PA, and the water temperature TW from outside of the control circuit 20, and outputs a full throttle torque value or an engine torque limit to the engine torque restriction device 36.

The engine torque restriction device 36 outputs an engine torque command to the difference calculation device 37. The engine torque command is also output from the control circuit 20, and is transmitted to an engine torque control device 38 in the engine control device 26. The engine torque control device 38 outputs a control signal to the engine E.

The difference calculation device 37 outputs a motor torque command to a motor torque control device 39 in the power drive unit 23, and the motor torque control device 39 outputs a control signal to the main motor 19.

Next, referring to FIG. 1, the function of this embodiment will be explained. First, the function of the control system when the vehicle is driven by the driving force of the engine E will be explained. The driving force output by the engine E is transmitted via the sub motor 1 to the oil pump 2 and the planetary gear 3 to drive them. The oil pump 2 generates oil pressure and transmits it via the oil pressure control device 24 to the side chambers 8 and 9 in the CVT 4. The planetary gear 3 is operated by the select lever (not shown) so as to change the rotational direction of the output shaft thereof, and changes the running direction of the vehicle.

The rotation of the output shaft of the planetary gear 3 is transmitted to the driving pulley 5 in the CVT 4, and the rotation of the driving pulley 5 is transmitted via the metal belt 6 to the driven pulley 7. The rotational speed ratio of the driving pulley 5 and the driven pulley 7 is determined by the wrapping diameters of the metal belt 6 around the pulleys 5 and 7, and the wrapping diameters are adjusted by the oil pressures applied to the side chambers 8 and 9. That is, the widths of the pulleys 5 and 7 are respectively changed in accordance with the pushing forces generated by the oil pressures applied to the side chambers 8 and 9, and the contact areas of the metal belt 6 shift along the slopes of the inner side walls of the pulleys 5 and 7 in accordance with the widths of the pulleys 5 and 7. The oil pressures applied to the side chambers 8 and 9 are respectively controlled by the oil pressure control device 24.

The rotation of the driven pulley 7 in the CVT 4 is transmitted to the engaging element 11 in the clutch 10. The clutch control actuator 13 can engage or disengage the engaging elements 11 and 12. When the engaging elements 11 and 12 are disengaged, the rotation of the engaging element 11 is not transmitted to the engaging element 12.

In contrast, when the engaging elements 11 and 12 are engaged to each other, the rotation of the engaging element 11 is transmitted to the engaging element 12, and is further transmitted to the final reduction gear 14 and the gear 15.

The rotation of the gear 15 is transmitted, via the gear 18 engaging with the gear 15, to the rotational shaft of the main motor 19. If the vehicle is in a mode in which the main motor 19 generates electric power so as to charge the power storage unit 21, electric power generated by the main motor 19 is stored in the power storage unit 23 via the power drive unit 23.

In contrast, if the vehicle is in a mode in which charging of the power storage unit 21 by the main motor 19 is not performed, electric power generated by the main motor 19 is not transmitted to the power storage unit 23, and the main motor 19 is merely idled.

The rotation of the final reduction gear 14 is transmitted to the driving wheels via the differential gear 16 and the driving shaft 17. Thus, the driving wheels are driven by the engine E, and the vehicle runs.

On the other hand, in the case where the vehicle is driven by the main motor 19, while the clutch 10 is disengaged, the power storage unit 21 supplies electric power to the main motor 19 via the power drive unit 23. The main motor 19 rotates the gear 18, and the rotation is transmitted to the final reduction gear 14 via the gear 15. In this case, because the engaging elements 11 and 12 in the clutch 10 are disengaged, the rotation of the final reduction gear 14 is not transmitted to the CVT 4. Therefore, the rotation of the final reduction gear 14 is transmitted only to the differential gear 16, and is further transmitted via the driving shaft 17 to the driving wheels W. In this way, the driving wheels W are driven by the main motor 19, and the vehicle runs.

It is also possible to drive the vehicle using both the driving forces of the engine E and of the main motor 19. In this case, the clutch 10 is engaged, and, while driving the driving wheels W by the engine E, the main motor 19 generates a driving force to assist the driving force of the engine E.

Next, the operation for applying engine braking by generating a braking force using the engine E as a load will be explained. In this case, the rotation of the driving wheels W is transmitted to the clutch 10 via the driving shaft 17, the differential gear 16, and the final reduction gear 14.

When engine braking is applied, the clutch 10 is engaged. That is, the engaging elements 12 and 11 are engaged to each other by the clutch control actuator 13. Thus, the rotation of the final reduction gear 14 is transmitted via the clutch 10 to the driven pulley 7 in the CVT 4.

The rotation of the driven pulley 7 is transmitted via the metal belt 6 to the driving pulley 5, and is further transmitted to the planetary gear 3. The rotation of the planetary gear 3 is transmitted to the engine E via the oil pump 2 and the sub motor 1, and the engine E generates a braking force so as to apply engine braking to the vehicle.

Next, the operation for obtaining a regenerative braking force by the main motor 19 will be explained. In this case, the clutch 10 is disengaged, and the rotation of the driving wheels W is transmitted via the driving shaft 17, the differential gear 16, and the final reduction gear 14, to the gear 15. The rotation of the gear 15 is further transmitted via the gear 18 to the rotational shaft of the main motor 19.

When the rotational shaft is rotated, the main motor 19 generates electric power as a generator. The main motor 19 and the power storage unit 21 are electrically connected by the power drive unit 23 when a regeneration operation is performed. Therefore, the electric power generated by the main motor 19 is transmitted via the power drive unit 23 to the power storage unit 21, and is stored therein. In this way, by drawing electric power from the main motor 19, the main motor 19 generates a rotational load, and regenerative braking of the vehicle is performed.

Next, the operation of the control system will be explained. The control circuit 20 controls the oil pressure control device 24 so that suitable oil pressures are respectively supplied to the side chambers 8 and 9 in the CVT 4 from the oil pump 2. By controlling the oil pressures in the side chambers 8 and 9, the widths of the driving pulley 5 and the driven pulley 7 are changed to adjust the wrapping diameters of the metal belt 6, and the transmission ratio is changed. The transmission ratio of the CVT 4 is continuously detected by the ratio sensor 31 in the CVT 4, and the measured value is transmitted to the control circuit 20.

The control circuit 20 also controls the clutch control actuator 13 provided in the clutch 10 so as to engage or disengage the engaging elements 11 and 12 in the clutch 10.

Furthermore, the control circuit 20 controls the power drive unit 23 so as to connect or disconnect the main motor 19 and the power storage unit 21. That is, when the electric power is applied from the power storage unit 21 to the main motor 19 to drive the vehicle using the motor 19, or when the electric power generated by the main motor 19 is stored in the power storage unit 21 so as to perform regenerative braking, the power drive unit 23 connects the power storage unit 21 to the main motor 19. In contrast, when the vehicle is driven using only the engine E, or when only engine braking is applied to the vehicle, the power drive unit 23 disconnects the power storage unit 21 from the main motor 19.

In addition, the control circuit 20 receives the remaining battery charge SOC (state of charge) of the power storage unit 21 detected by the remaining battery charge sensor 22; the water temperature TW, the engine speed Ne, the intake air temperature TA, the intake air pressure PA, and the amount of depression of the accelerator pedal AP, which are detected by the engine sensor 25 provided on the engine E; the catalyst temperature TCAT detected by the catalyst temperature sensor 28 provided in the exhaust system 29; and the vehicle speed VCar detected by the vehicle speed sensor 30.

The control circuit 20 controls the engine control device 26 so as to perform the control of the engine E such as the torque control of the engine E.

Next, referring to FIG. 2, the operation of the control circuit 20 will be explained in detail. First, an explanation will be given for the case that a request for quick acceleration (kick down request) is detected when the vehicle is running using the engine E. A request for a quick acceleration is transmitted to the vehicle when a driver on the vehicle depresses the accelerator pedal. The amount of depression of the accelerator pedal AP is detected by the engine sensor 25, and the detection result is transmitted to the requested driving force calculation device 32 in the control circuit 20.

Also, the vehicle speed VCar which will be changed in accordance with the operation of the accelerator pedal is detected by the vehicle speed sensor 30, and the measured value is transmitted to the requested driving force calculation device 32 in the control circuit 20.

The requested driving force calculation device 32 computes a torque requested for driving the vehicle (requested torque) based on the amount of depression of the accelerator pedal AP and the vehicle speed VCar, and transmits the requested torque value to the requested engine torque calculation device 33.

The requested engine torque calculation device 33 also receives the transmission ratio output from the ratio sensor 31 in the CVT 4. This transmission ratio is also input to the transmission efficiency calculation device 34, and the transmission efficiency calculation device 34 calculates the transmission efficiency of the CVT 4 at the present transmission ratio based on the input transmission ratio. The transmission ratio is input to the requested engine torque calculation device 33. In this embodiment, the transmission ratio is a value compensated by multiplying by the gear ratios of the final reduction gear 14 and the differential gear 16, and the transmission efficiency is a value compensated by multiplying by the transmission efficiencies of the final reduction gear 14 and the differential gear 16.

The requested engine torque calculation device 33 calculates the torque requested on engine E (requested engine torque) based on the requested torque value, the transmission ratio, and the transmission efficiency. The requested engine torque is input to the engine torque restriction device 36.

The full throttle torque calculation device 35 receives the engine speed Ne, the intake air temperature TA, the intake air pressure PA, and the water temperature TW, etc. from the outside of the control circuit 20. The full throttle torque calculation device 35 calculates the torque which can be generated by the engine E when the throttle is full open (fill throttle torque) based on the above information, and transmits it to the engine torque restriction device 36.

The engine torque restriction device 36 computes an engine torque command based on the requested engine torque, and the fill throttle torque. That is, if the requested engine torque is greater than the full throttle torque, the engine torque restriction device 36 outputs the full throttle torque as an engine torque command. In contrast, if the requested engine torque is no more than the full throttle torque, the engine torque restriction device 36 outputs the requested engine torque as an engine torque command.

The engine torque command is transmitted to the engine torque control device 38, and the engine torque control device 38 controls the torque output by the engine E.

The difference calculation device 37 receives the requested engine torque and the engine torque command, and calculates the difference between them to output this as a motor torque command. That is, the value obtained by subtracting the engine torque command from the requested engine torque is output as a motor torque command. In other words, the motor torque command is the deficiency in the engine torque command compared to the requested engine torque. The motor torque command is transmitted to the motor torque control device 39, and motor torque control device 39 controls the torque generated by the main motor 19 based on the motor torque command.

Figure 2:
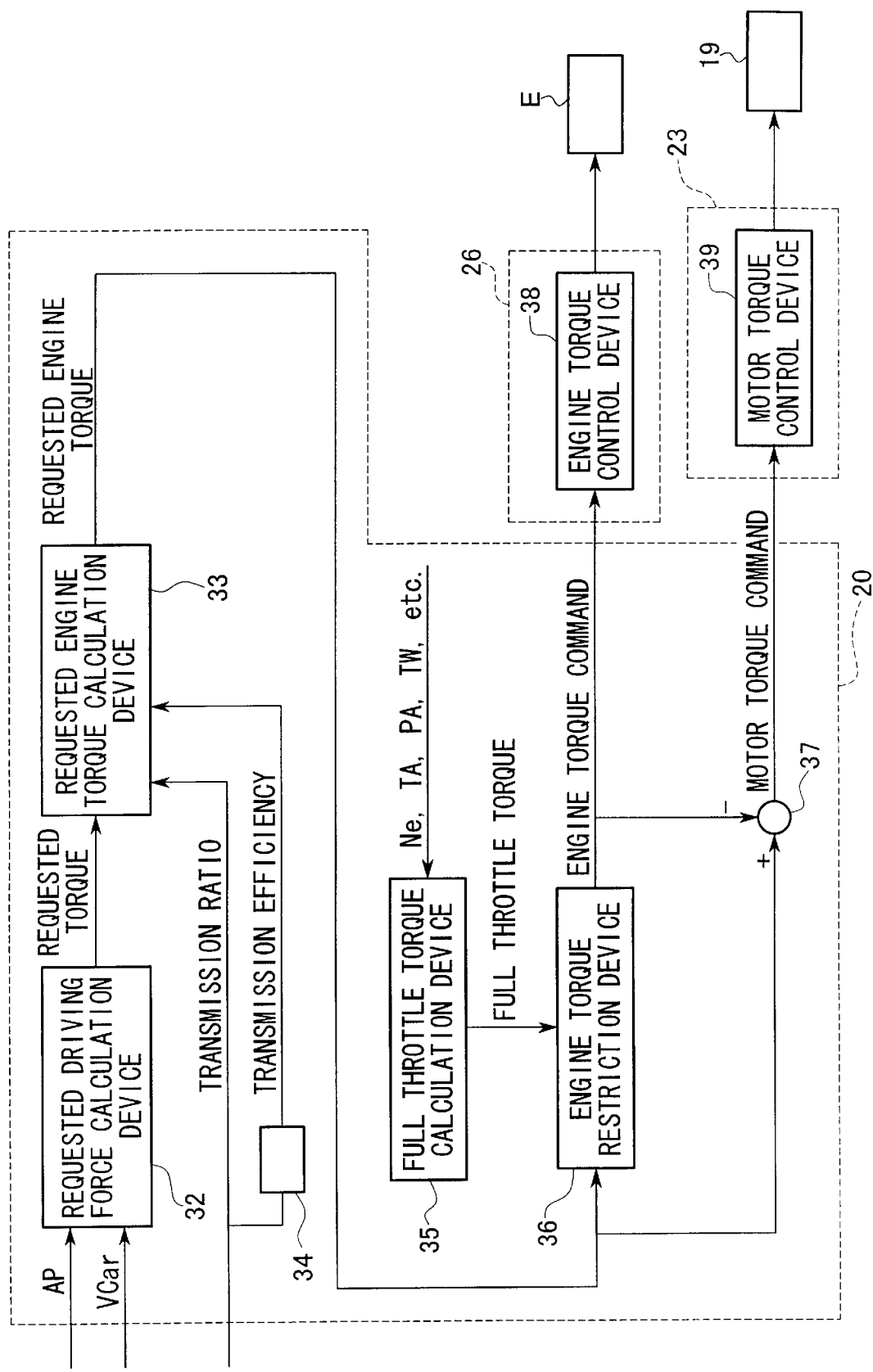
FIG. 2 is a block diagram illustrating in detail a control circuit of the first embodiment.
Figure 4:
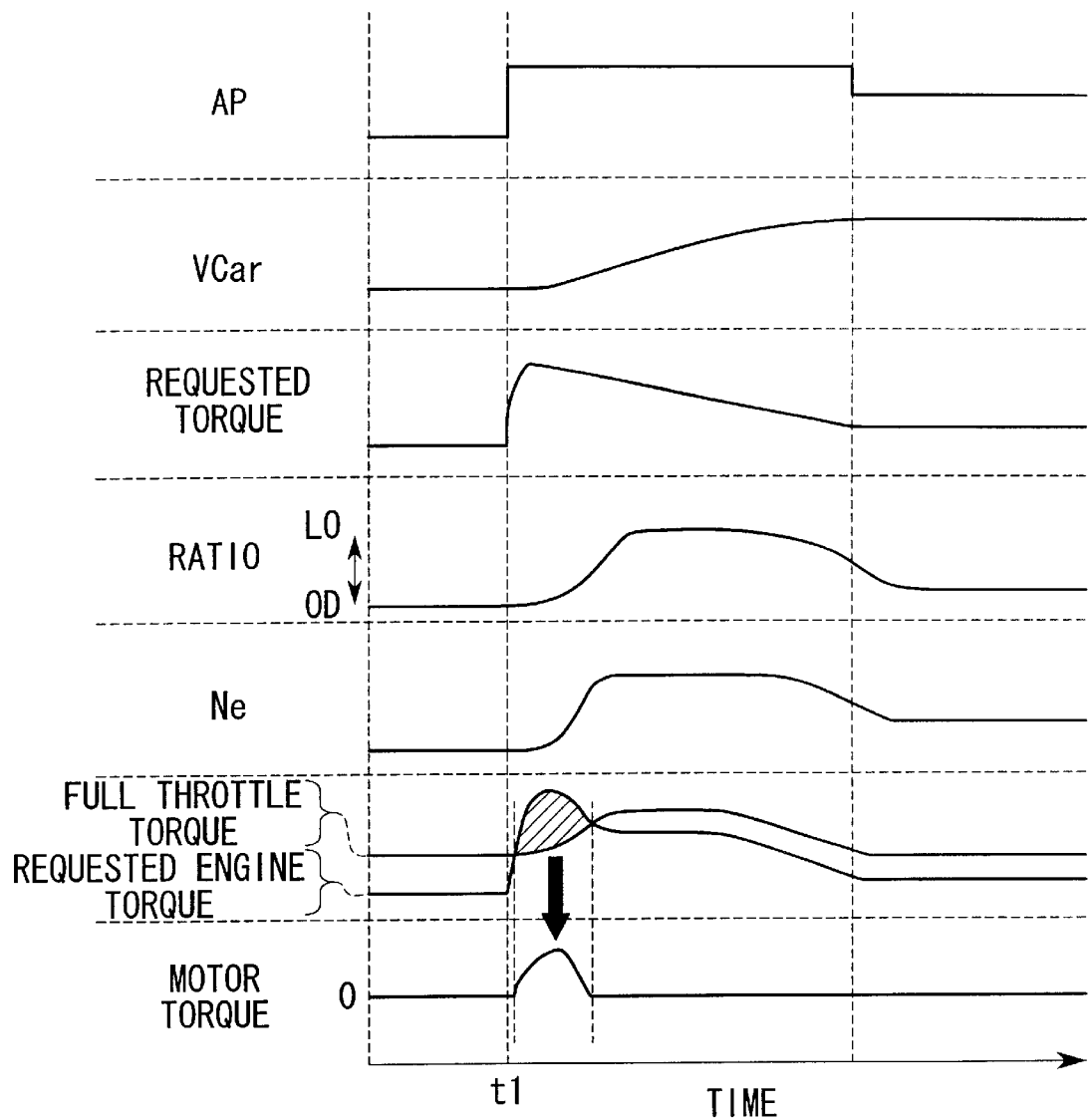
FIG. 4 is a timing chart for explaining the function of the control circuit shown in FIG. 2.

FIG. 4 is a timing chart illustrating the operation of the control circuit 20 of the first embodiment shown in FIG. 2. At a time t1, the accelerator pedal is depressed, and amount of depression of the accelerator pedal AP is increased. However, the vehicle speed VCar is not increased yet at this time t1.

The amount of depression of the accelerator pedal AP and the vehicle speed VCar are continuously transmitted to the requested driving force calculation device 32, and the requested driving force calculation device 32 outputs the requested torque. The requested torque is quickly increased at the time t1 because the vehicle speed VCar is not increased regardless of the increment of the amount of depression of the accelerator pedal AP.

On the other hand, in response to the depression of the accelerator pedal, a kick down operation is performed, and the transmission ratio of the CVT 4 is shifted to the lower side (Lo side). However, this shift of the transmission ratio takes a certain time, and in accordance with the change of the transmission ratio, the engine speed Ne is increased for a certain time.

The requested engine torque is quickly increased in the same manner as the requested torque. However, because the engine E cannot produce a torque greater than the full throttle torque at that time, the deficiency in torque obtained by subtracting the full throttle torque from the requested engine torque is supplied as the motor torque.

SECOND EMBODIMENT

Figure 3:
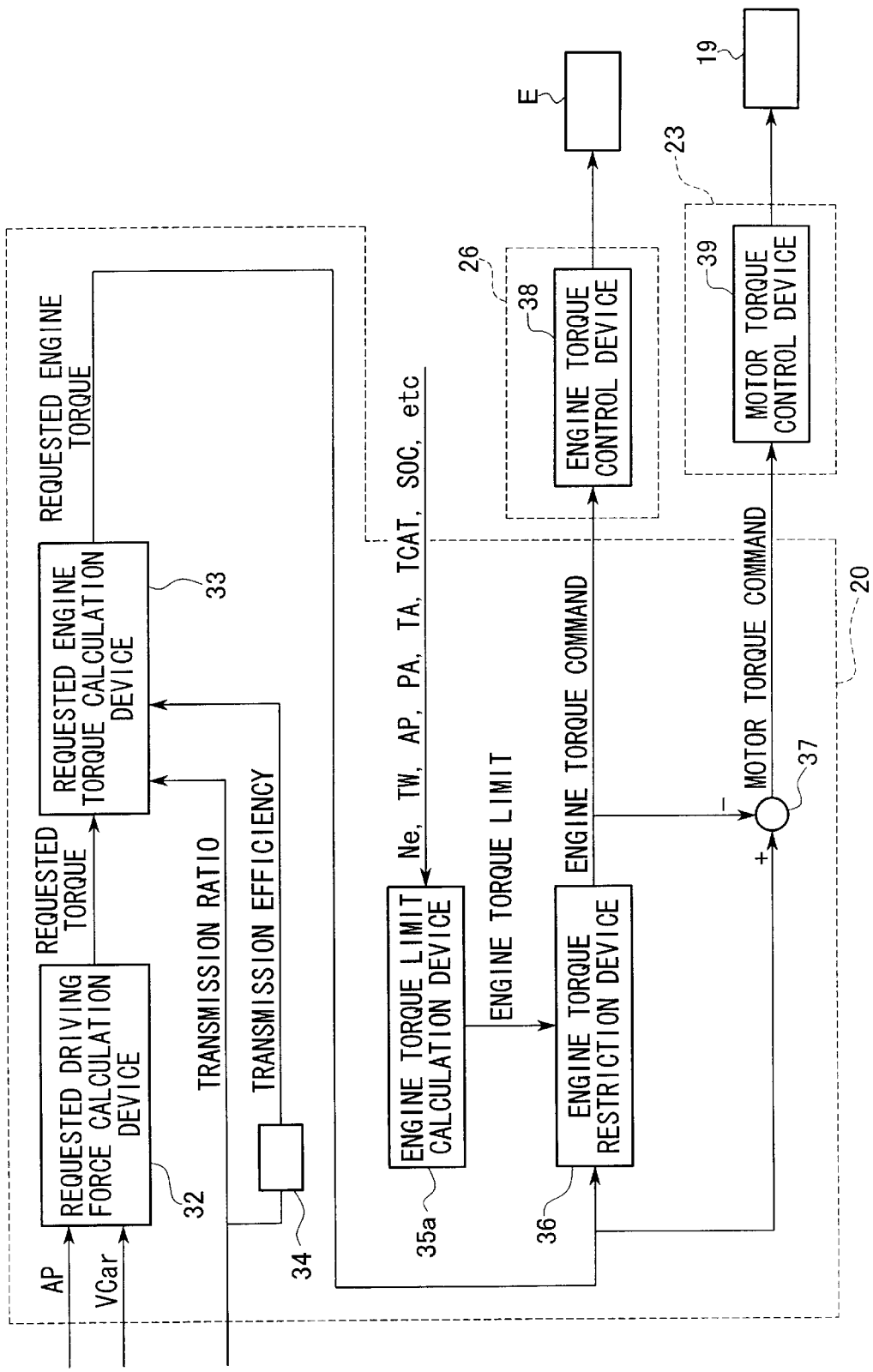
FIG. 3 is a block diagram illustrating in detail a control circuit of a second embodiment of the present invention.

Next, a second embodiment of the present invention will be explained referring to FIG. 3 illustrating the control circuit 20 of the second embodiment.

In the control circuit 20 shown in FIG. 3, an engine torque limit calculation device 35a is provided instead of the full throttle torque calculation device 35 shown in FIG. 2. This engine torque limit calculation device 35a receives the engine speed Ne, the intake air temperature TA, the intake air pressure PA, the water temperature TW, the amount of depression of the accelerator pedal AP, the catalyst temperature TCAT, and the remaining battery charge SOC of the power storage unit 21, etc., and based on this information, the engine torque limit calculation device 35a calculates the engine torque limit.

The engine torque limit is input to the engine torque restriction device 36, and the engine torque restriction device 36 determines whether a restriction should be applied to the requested engine torque. That is, if the requested engine torque is greater than the engine torque limit, the engine torque restriction device 36 outputs the engine torque limit as an engine torque command (a restriction is applied to the requested engine torque). In contrast, if the requested engine torque is no more than the engine torque limit, the engine torque restriction device 36 outputs the requested engine torque as an engine torque command (a restriction is not applied to the requested engine torque).

Therefore, if the requested engine torque is greater than the engine torque limit, the torque to be generated by the engine E is limited to the engine torque limit, and the deficiency in torque is supplemented by the main motor 19.

Figure 5:
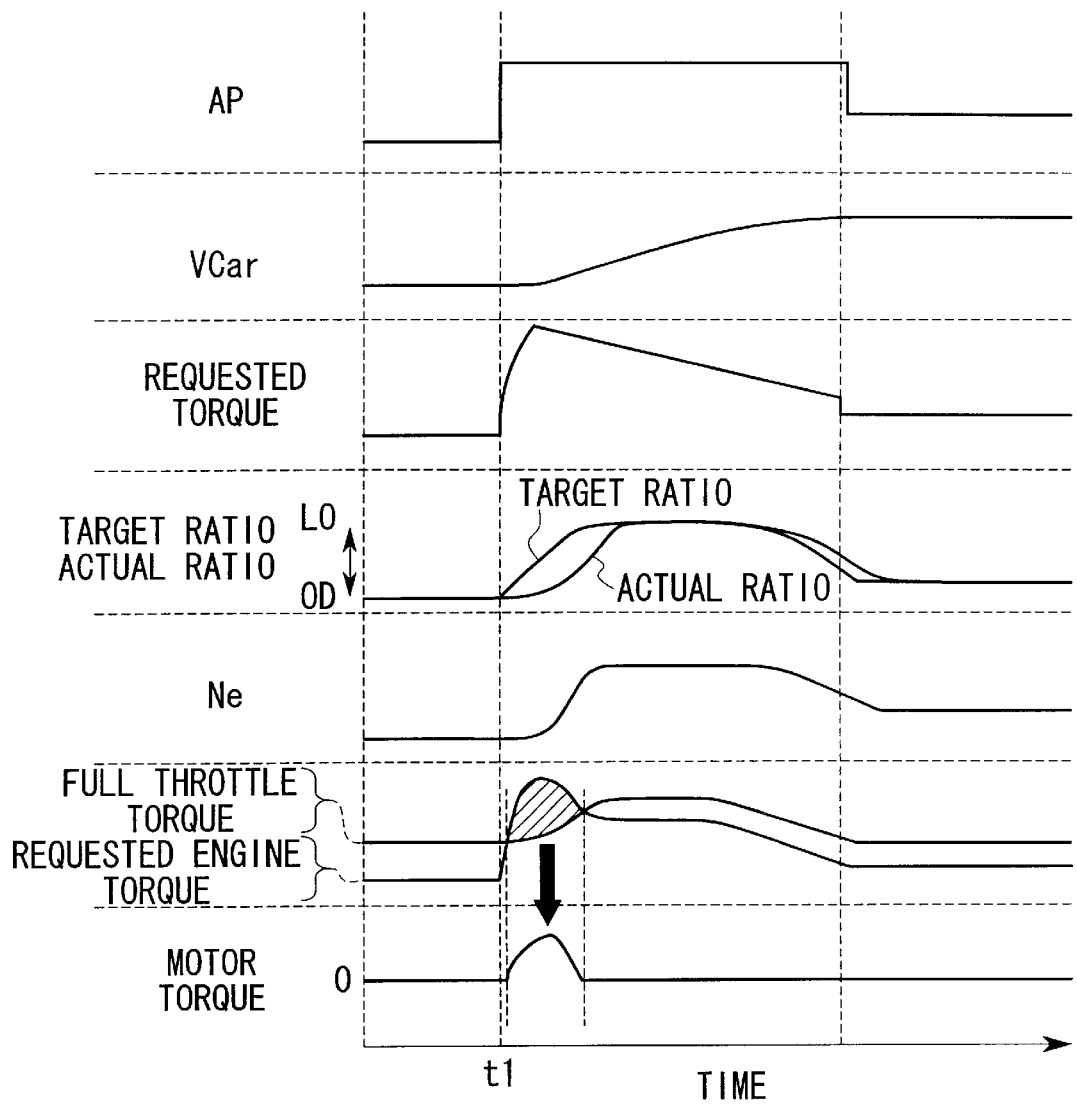
FIG. 5 is a timing chart for explaining the function of the control circuit shown in FIG. 3.

FIG. 5 is a timing chart illustrating the operation of the control circuit 20 of the second embodiment shown in FIG. 3. The operation in this embodiment is similar to that shown in FIG. 4; however, this operation is different from that of FIG. 4 in that the requested engine torque is restricted based on the engine torque limit. The deficiency in torque obtained by subtracting the engine torque limit from the requested engine torque is supplied as the motor torque.

THIRD EMBODIMENT

Figure 6:
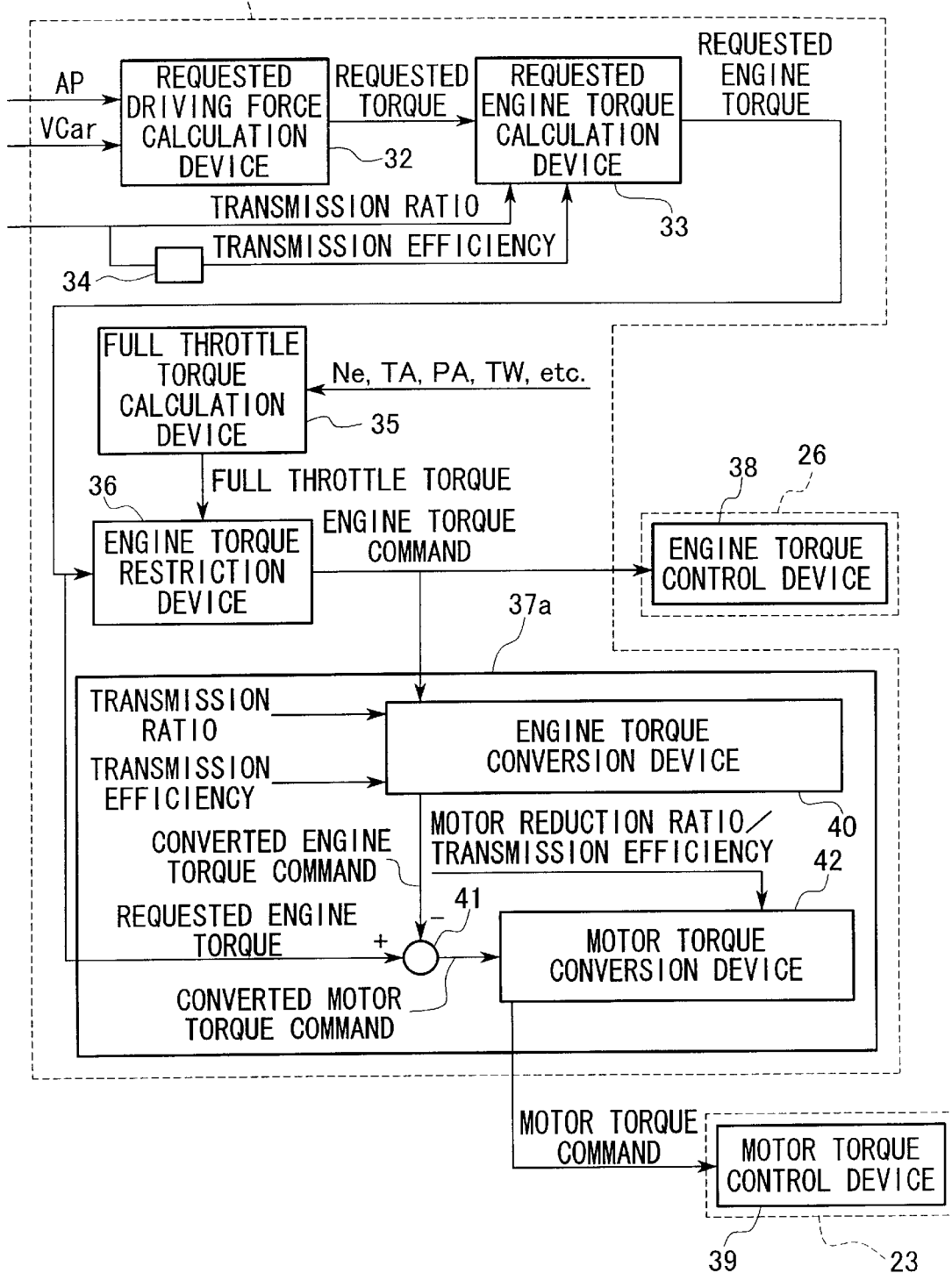
FIG. 6 is a block diagram illustrating a control circuit of a third embodiment of the present invention.

Next, referring to FIG. 6, a third embodiment of the present invention will be explained. FIG. 6 is a block diagram illustrating a control circuit 20 of the third embodiment, and in this figure, the elements corresponding to the elements shown in FIG. 2 have the same reference numbers, and the explanation thereof will be omitted.

This control circuit 20 is different from that of FIG. 2 in that a motor torque command output device 37a is provided instead of the difference calculation device 37 shown in FIG. 2. The motor torque command output device 37a comprises an engine torque conversion device 40, a difference calculation device 41, and a motor torque conversion device 42.

The engine torque conversion device 40 receives the engine torque command output by the engine torque restriction device 36, the transmission ratio of the CVT 4 input from the outside of the control circuit 20, and the transmission efficiency output by the transmission efficiency calculation device 34, and outputs a converted engine torque command. The engine torque command output by the engine torque restriction device 36 is the value of the torque which is directly output by a crank shaft of the engine E. That is, the engine torque command is the value of the torque at the most upstream point of the torque transmission passage through which the torque produced by the engine E is transmitted to the driving wheels W.

The engine torque conversion device 40 converts the engine torque command to the converted engine torque command, which is the value of the torque to be applied to the driving wheels W at the most downstream point of the torque transmission passage. This conversion is performed based on the transmission ratio and the transmission efficiency. That is, the relationship between the engine torque command and the converted engine torque command is changed in accordance with the transmission ratio and the transmission efficiency.

The difference calculation device 41 calculates the difference between the requested engine torque output by the requested engine torque calculation device 33 and the converted engine torque command output by the engine torque conversion device 40, and outputs the calculation result as the converted motor torque command. The requested engine torque is the value of the torque which is converted by the requested engine torque calculation device 33 based on the transmission ratio and the transmission efficiency so as to be the value of the torque to be applied to the driving wheels W. Therefore, the value obtained by subtracting the converted engine torque command from the requested engine torque is the converted motor torque command to be applied to the driving wheels W.

The motor torque conversion device 42 converts the converted motor torque command output by the difference calculation device 41 to the motor torque command which is the value of the torque to be directly produced by the main motor 19. This conversion by the motor torque conversion device 42 is performed based on the motor reduction gear ratio (this includes the gear ratios of the final reduction gear 14 and the differential gear 16) and the transmission efficiency of the motor torque (this is the transmission efficiency of the transmission passage, including the final reduction gear 14 and the differential gear 16, from the main motor 19 to the driving shaft 17).

The motor torque command output by the motor torque conversion device 42 is input to the motor torque control device 39, and the main motor 19 is controlled in accordance with this motor torque command.

According to this embodiment, the motor torque command output device 37a calculates the difference between the torque values converted to values at the most downstream point of the torque transmission passage, and further converts the calculated difference to the torque value at the most upstream point of the torque transmission passage so as to output the motor torque command. Therefore, the precision of the motor torque command can be improved.

FOURTH EMBODIMENT

Figure 7:
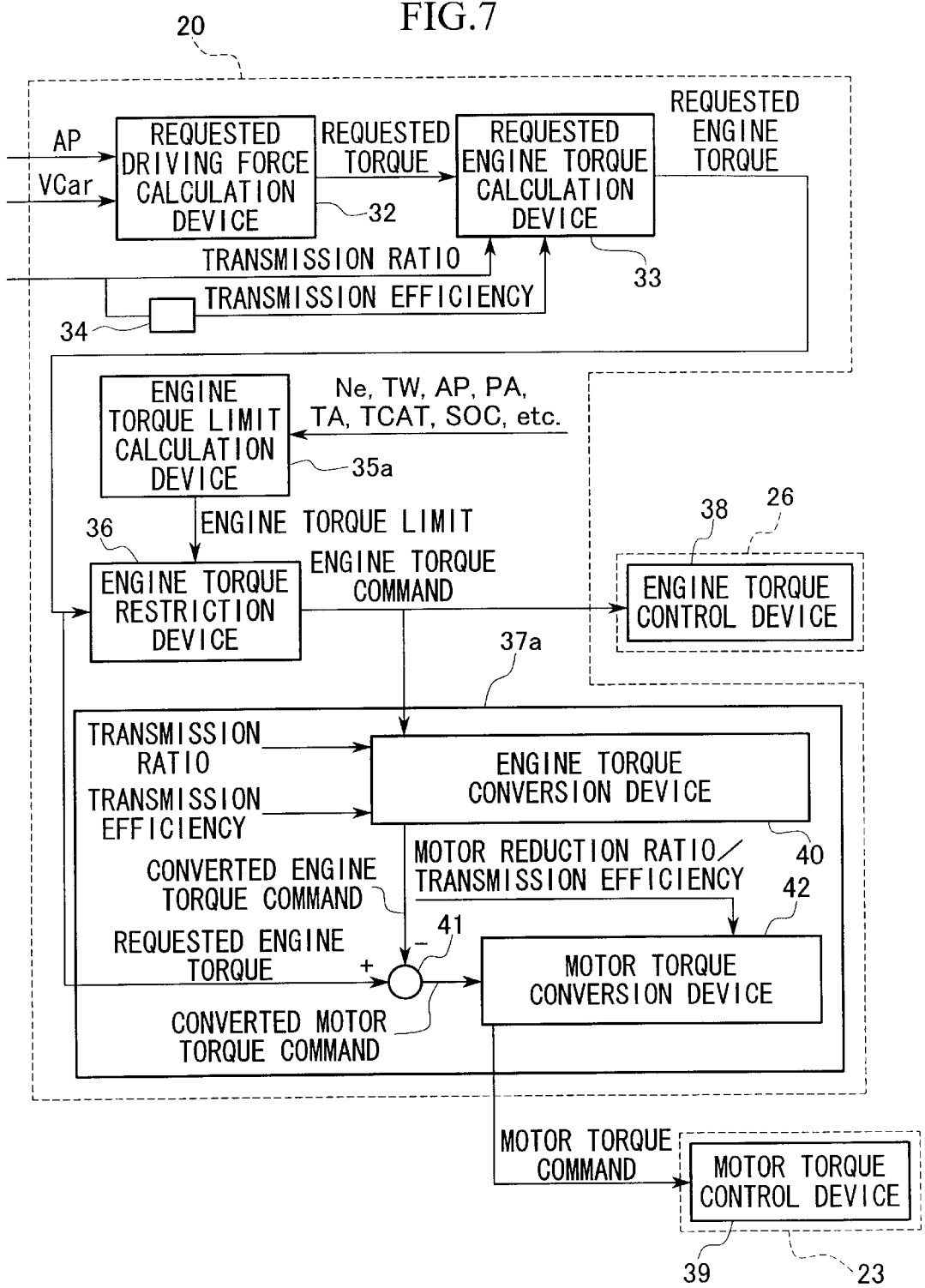
FIG. 7 is a block diagram illustrating a control circuit of a fourth embodiment of the present invention.

Next, referring to FIG. 7, a fourth embodiment of the present invention will be explained. The fourth embodiment is a modification of the second embodiment shown in FIG. 3, and FIG. 7 is a block diagram illustrating a control circuit 20 of the fourth embodiment. In FIG. 7, the elements corresponding to the elements shown in FIG. 3 have the same reference numbers, and the explanation thereof will be omitted.

This control circuit 20 is different from that of FIG. 3 in that the motor torque command output device 37a which is the same as that of the third embodiment shown in FIG. 6 is provided in place of the difference calculation device 37 shown in FIG. 3.

According to the fourth embodiment, similarly to the third embodiment, the motor torque command output device 37a calculates the difference between the torque values converted to values at the most downstream point of the torque transmission passage, and further converts the calculated difference to the torque value at the most upstream point of the torque transmission passage so as to output the motor torque command. Therefore, the precision of the motor torque command can be improved.

FIFTH EMBODIMENT

Figure 8:
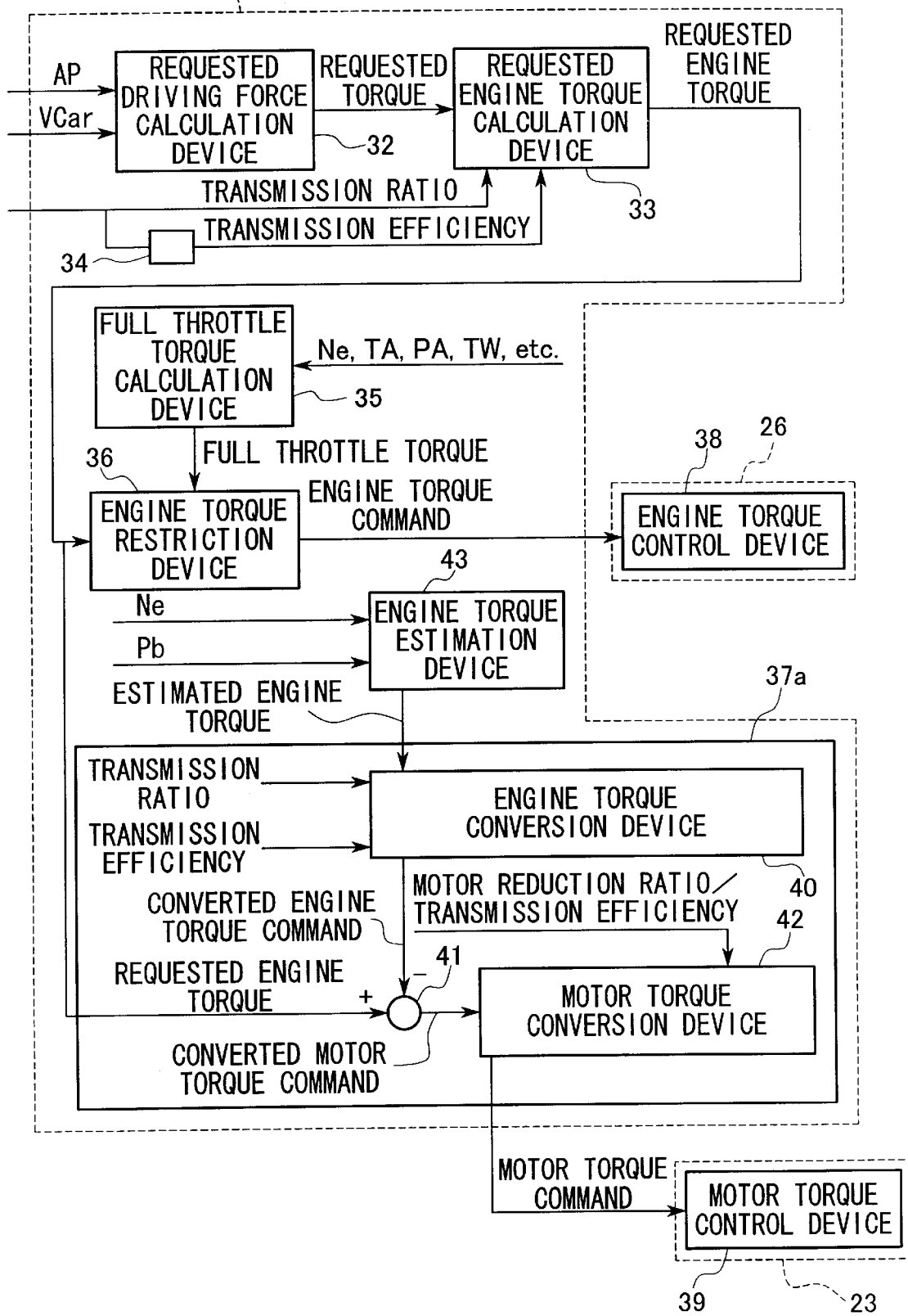
FIG. 8 is a block diagram illustrating a control circuit of a fifth embodiment of the present invention.

Next, referring to FIG. 8, a fifth embodiment of the present invention will be explained. The fifth embodiment is a modification of the third embodiment shown in FIG. 6, and FIG. 8 is a block diagram illustrating a control circuit 20 of the fifth embodiment. In FIG. 8, the elements corresponding to the elements shown in FIG. 6 have the same reference numbers, and the explanation thereof will be omitted.

This control circuit 20 is different from that of FIG. 6 in that an engine torque estimation device 43 is provided for estimating the torque of the engine E based on the actual operation states of the engine E. This engine torque estimation device 43 receives the engine speed Ne and the air intake passage pressure Pb, estimates the torque which is being output by the engine E at that time based on these information, and outputs the estimated value as the estimated engine torque. This estimated engine torque is the estimated value of the torque to be directly output by a crank shaft of the engine E.

In the third embodiment, the engine torque command output by the engine torque restriction device 36 is input to the engine torque conversion device 40. In contrast, in this fifth embodiment, the estimated engine torque output by the engine torque estimation device 43 is input to the engine torque conversion device 40.

According to the fifth embodiment, the torque being output by the engine E is estimated based on the actual driving states of the engine E, that is, based on the information derived from the actual operation of the engine E. Therefore, it is possible to improve the precision of the motor torque command for controlling the main motor 19 in comparison with the third embodiment in which the engine torque command value is used as the engine torque.

SIXTH EMBODIMENT

Figure 9:
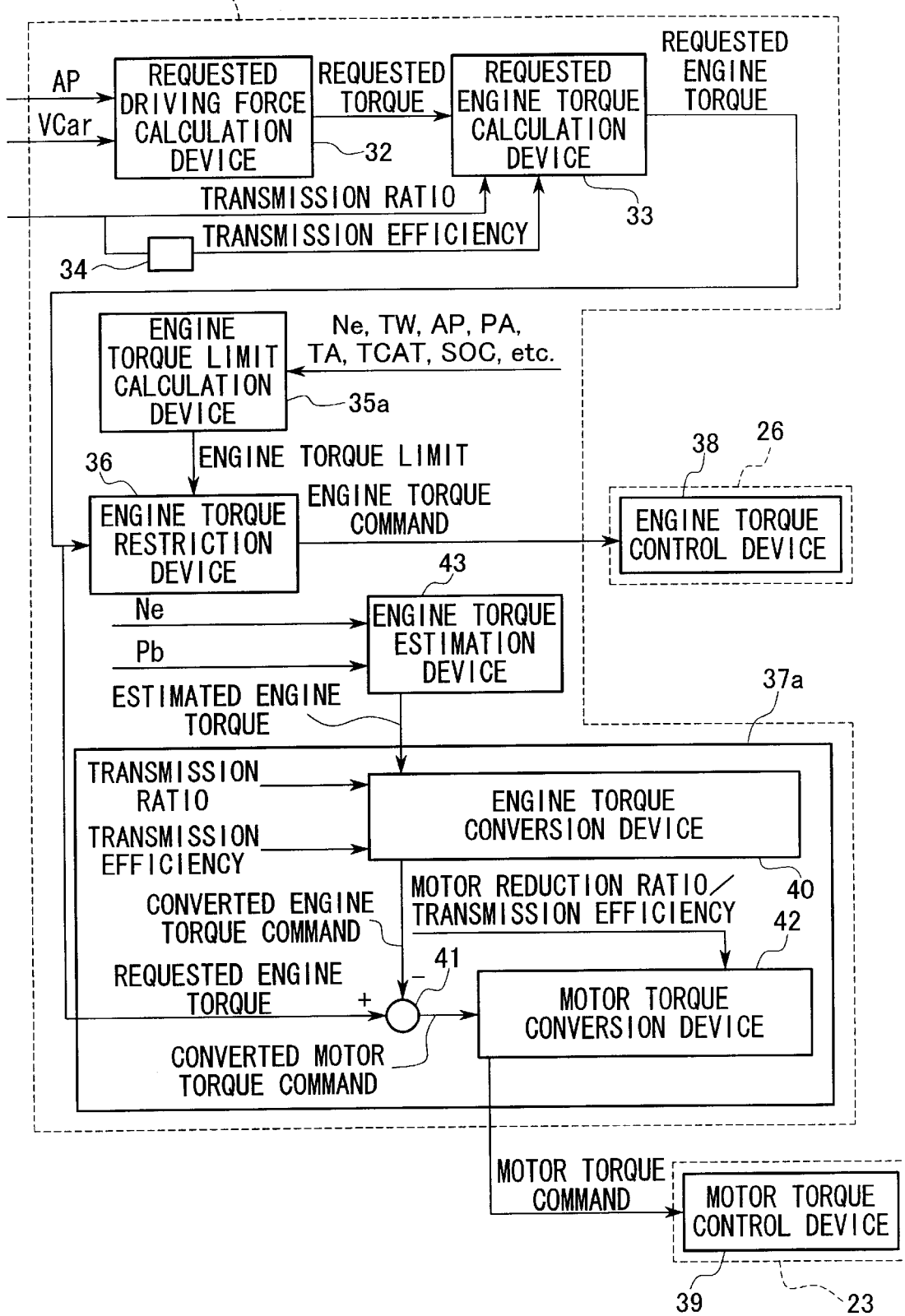
FIG. 9 is a block diagram illustrating a control circuit of a sixth embodiment of the present invention.

Next, referring to FIG. 9, a sixth embodiment of the present invention will be explained. The sixth embodiment is a modification of the fourth embodiment shown in FIG. 7, and FIG. 9 is a block diagram illustrating a control circuit 20 of the sixth embodiment. In FIG. 9, the elements corresponding to the elements shown in FIG. 7 have the same reference numbers, and the explanation thereof will be omitted.

This control circuit 20 is different from that of FIG. 7 in that the engine torque estimation device 43 which is the same as that of the fifth embodiment shown in FIG. 8 is provided for estimating the torque of the engine E based on the actual operation state of the engine E. This engine torque estimation device 43 receives the engine speed Ne and the air intake passage pressure Pb, and outputs the estimated engine torque. Furthermore, the estimated engine torque output by the engine torque estimation device 43 is input to the engine torque conversion device 40.

According to the sixth embodiment, because the torque being output by the engine E is estimated based on the actual driving states of the engine E, it is possible to improve the precision of the motor torque command for controlling the main motor 19 in comparison with the fourth embodiment in which the engine torque command value is used as the engine torque.

The present invention is not limited only to the above embodiment, but can be modified within the scope of the present invention.

What is claimed is:

1. A control apparatus for a hybrid vehicle, comprising:
   a requested torque calculating device which calculates a torque requested for driving the hybrid vehicle; and
   a torque control device which controls a torque generated by an engine and a torque generated by an electric motor of the hybrid vehicle based on the requested torque calculated by the requested torque calculating device;
   wherein the torque control device controls the electric motor so as to generate a torque obtained by subtracting a torque to be generated by the engine from the requested torque, and
   wherein the torque control device comprises an engine torque restricting device which restricts the torque to be generated by the engine in accordance with a predetermined condition.

2. A control apparatus according to claim 1, wherein when the requested torque is greater than a maximum torque which the engine can generate the torque control device controls the engine so as to generate the maximum torque and controls the electric motor so as to generate a torque obtained by subtracting the maximum torque from the requested torque.

3. A control apparatus according to claim 1, wherein the engine torque restricting device restricts the torque to be generated by the engine when a temperature of a catalyst provided in an exhaust system of the engine is higher than a predetermined temperature.

4. A control apparatus according to claim 1, wherein the engine torque restricting device restricts the torque to be generated by the engine when a remaining battery charge of a power storage unit is greater than a predetermined battery charge.

5. A control apparatus according to claim 1, wherein the engine torque restricting device stops restricting the torque to be generated by the engine when the requested torque is greater than a predetermined torque.

6. A control apparatus according to claim 1, wherein the requested torque calculating device calculates a torque requested for driving driving wheels of the hybrid vehicle, the torque control device comprises a conversion device which converts an engine torque to be generated by the engine to a driving wheel torque to be applied to the driving wheels based on at least a transmission ratio in a transmission which transmits driving force from the engine to the driving wheels, and
   the torque control device controls the electric motor so as to generate a torque obtained by subtracting the driving wheel torque converted by the conversion device from the requested torque.

7. A hybrid vehicle comprising:
   an engine which generates a torque for driving the hybrid vehicle;
   a transmission which is connected to an output shaft of the engine;
   driving wheels which are connected to an output shaft of the transmission;
   an electric motor which is connected to the driving wheels and assists the torque generated by the engine;
   a requested torque calculating device which calculates a torque requested for driving the hybrid vehicle; and
   a torque control device which controls a torque generated by an engine and a torque generated by an electric motor of the hybrid vehicle based on the requested torque calculated by the requested torque calculating device;
   wherein the torque control device controls the electric motor so as to generate a torque obtained by subtracting a torque to be generated by the engine from the requested torque, and
   wherein the torque control device comprises an engine torque restricting device which restricts the torque to be generated by the engine in accordance with a predetermined condition.

8. A control method for a hybrid vehicle, comprising:
   calculating a torque requested for driving the hybrid vehicle;
   controlling a torque generated by an engine and a torque generated by an electric motor of the hybrid vehicle based on the requested torque calculated by the requested torque calculating device; and
   controlling the electric motor so as to generate a torque obtained by subtracting a torque to be generated by the engine from the requested torque,
   wherein the torque generated by the engine is controlled to be restricted in accordance with a predetermined condition.

* * * * *